(12) United States Patent
Haster

(10) Patent No.: US 8,331,219 B2
(45) Date of Patent: Dec. 11, 2012

(54) TRANSFER OF USER DIAL PLAN TO AN ACCESS GATEWAY

(75) Inventor: Lars-Olof Haster, Huddinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 484 days.

(21) Appl. No.: 12/531,417

(22) PCT Filed: Mar. 10, 2008

(86) PCT No.: PCT/IB2008/000563
§ 371 (c)(1),
(2), (4) Date: Sep. 15, 2009

(87) PCT Pub. No.: WO2008/110896
PCT Pub. Date: Sep. 18, 2008

(65) Prior Publication Data
US 2010/0103812 A1 Apr. 29, 2010

Related U.S. Application Data

(60) Provisional application No. 60/894,966, filed on Mar. 15, 2007.

(51) Int. Cl.
*G01R 31/08* (2006.01)
(52) U.S. Cl. .......................................... 370/217; 379/23
(58) Field of Classification Search ........................ None
See application file for complete search history.

(56) References Cited

U.S. PATENT DOCUMENTS

| 6,131,025 | A  | * | 10/2000 | Riley et al. ................ 455/414.1 |
| 7,366,110 | B2 | * | 4/2008  | Gillespie et al. ............... 370/254 |
| 7,532,568 | B1 | * | 5/2009  | Boudreaux et al. ........... 370/217 |
| 7,564,840 | B2 | * | 7/2009  | Elliott et al. .................. 370/356 |

FOREIGN PATENT DOCUMENTS

| WO | WO 02/13503 A   | 2/2002 |
| WO | WO 2005/084041 A | 9/2005 |

OTHER PUBLICATIONS

Taylor, Tom; Nortel; "Draft H.248.1 Version 3" ITU-T Draft Study Period 2005-2008, International Telecommunication Union, Geneva, CH vol Study Group 16, Jul. 26, 2005, pp. 1-215, XP017411447.

* cited by examiner

*Primary Examiner* — Nittaya Juntima
*Assistant Examiner* — Rhonda Murphy

(57) ABSTRACT

A system, method, and Soft Switch for maintaining a current user dial plan in an Access Gateway. When an H.248 control link is established between the Access Gateway and the Soft Switch, the Soft Switch downloads the current dial plan to the Access Gateway. The downloaded information includes termination IDs and Directory Numbers/Subscriber Numbers, DN/SNBs, for all of the users connected to the Access Gateway. Whenever the Soft Switch receives changes to the dial plan, the Soft Switch updates the user dial plan in the Access Gateway.

12 Claims, 3 Drawing Sheets

TRANSFER OF USER DIAL PLAN TO AN ACCESS GATEWAY

RELATED APPLICATIONS

This application claims the benefit of U.S. Provisional Application No. 60/894,966 filed Mar. 15, 2007.

TECHNICAL FIELD

This invention relates to communication networks. More particularly, and not by way of limitation, the invention is directed to a system, method, and Soft Switch for maintaining a current user dial plan in an Access Gateway.

BACKGROUND

The standardization of Access Gateways (AGw) has been ongoing in the Telecoms & Internet converged Services & Protocols for Advanced Networks (TISPAN) organization for some time. Initially, the standardization focused on an H.248 link to Soft Switches, and later addressed connecting AGw's to an IP Multimedia Subsystem (IMS) network by adding an Access Gateway Control Function (AGCF) that converts between SIP and H.248. The purpose of the AGCF is to enable the reuse of existing AGw's to connect users to the IMS.

FIG. 1 is a simplified block diagram illustrating an existing network architecture 10 for controlling an Access Gateway (AGw) 11 from a Soft Switch 12. The Access Gateway provides call handling for users 13 in the Public Switched Telephone Network (PSTN) who are accessing an Internet Protocol (IP) backbone network 14. The Access Gateway may act as a proxy toward the IP backbone network. The Access Gateway is controlled through the IP backbone network from the Soft Switch utilizing an H.248 control link 16. Access Gateway Management Systems 17 may connect to the Access Gateway through a Simple Network Management Protocol (SNMP) link 18 and the IP backbone network.

If the H.248 control link fails, the Access Gateway 11 can still route emergency calls from the PSTN to a pre-connected/configured port for the emergency numbers. The Access Gateway can also set up PSTN calls to other PSTN users connected to the same gateway. However, when all call setups are controlled by the H.248 control link, a link between groups of access gateway systems to connect a larger group of subscribers is not supported when the H.248 control link fails.

When setting up calls, the Access Gateway 11 does not have knowledge of the dialing or directory numbers. The connectivity of subscribes is controlled from the Soft Switch 12 with a termination identity used in the H.248 commands that has been provisioned in the Soft Switch, with a relation to the directory number. The Soft Switch knows only that the user is connected to an access gateway with its termination ID and what H.248 control link (e.g., UDP address) the user can be reached on.

Thus, in the event of an H.248 control link failure, the existing architecture does not function to enable call setup in an open environment over standardized interfaces.

SUMMARY

The present invention provides a system and method that enables full access gateway functionality in the event of an H.248 control link failure. The invention ensures that the Access Gateway user dial plan is always up to date in the Access Gateway. Thus, if there is a failure of the H.248 control link, the Access Gateway has the information it needs to set up calls for PSTN users.

In one embodiment, the present invention is directed to a method of maintaining a current user dial plan in an Access Gateway. The method includes the steps of establishing a control link between the Access Gateway and a Soft Switch having access to the current user dial plan; and in response to establishing the control link, downloading the current dial plan from the Soft Switch to the Access Gateway. The method may also include updating the user dial plan in the Access Gateway whenever there is a change in the user dial plan.

In another embodiment, the present invention is directed to a Soft Switch for maintaining a current user dial plan in an Access Gateway. The Soft Switch includes means for accessing the current user dial plan; means for establishing a control link between the Access Gateway and the Soft Switch; and means (44, 45) for downloading the current dial plan from the Soft Switch to the Access Gateway in response to establishing the control link. The Soft Switch may also include means for updating the user dial plan in the Access Gateway whenever there is a change in the user dial plan.

In another embodiment, the present invention is directed to a system for maintaining a current user dial plan in an Access Gateway. The system includes a Soft Switch for updating the user dial plan and sending the current user dial plan to the Access Gateway, and a memory in the Access Gateway for storing the current user dial plan. The Soft Switch may also include means for receiving changed information in the user dial plan, and means for updating the user dial plan by either downloading the changed information to the Access Gateway or downloading a modified user dial plan to the Access Gateway.

The invention also enables a management system to directly update or modify the dial plan in the Access gateway.

BRIEF DESCRIPTION OF THE DRAWINGS

In the following, the essential features of the invention will be described in detail by showing preferred embodiments, with reference to the attached figures in which.

DETAILED DESCRIPTION

The present invention provides a modified Access Gateway 21 and a modified Soft Switch 22. The invention ensures that the Access Gateway dial plan is always up to date in the Access Gateway if there is a failure of the H.248 control link.

A digital map (DigitMap) procedure is defined in the H.248.1 standard. According to the DigitMap procedure, the possible "dialing string" is sent to the Access Gateway 21. This "string" is then used when the user dials digits to optimize the signaling over the H.248 control link. For this to work, both the termination and its related number must be transferred to the Access Gateway. Alternatively, completely new packages can be defined for this purpose.

The H.248 control link to the Soft Switch 22 may fail, for example, in an emergency situation. In the failed condition, a PSTN user can still dial an emergency number or any other number that belongs to the group of subscribers connected to the Access Gateway. In order to dial other users connected to the same Access Gateway 21, the dialing table must be extended. The dialing table needs to be downloaded by the Soft Switch in this case. The missing information in the DigitMap table known to the Access Gateway is the relation between the terminations and the dialed number, and therefore, this information must be transferred from the Soft Switch 22 to the Access Gateway 21.

Figure 1:
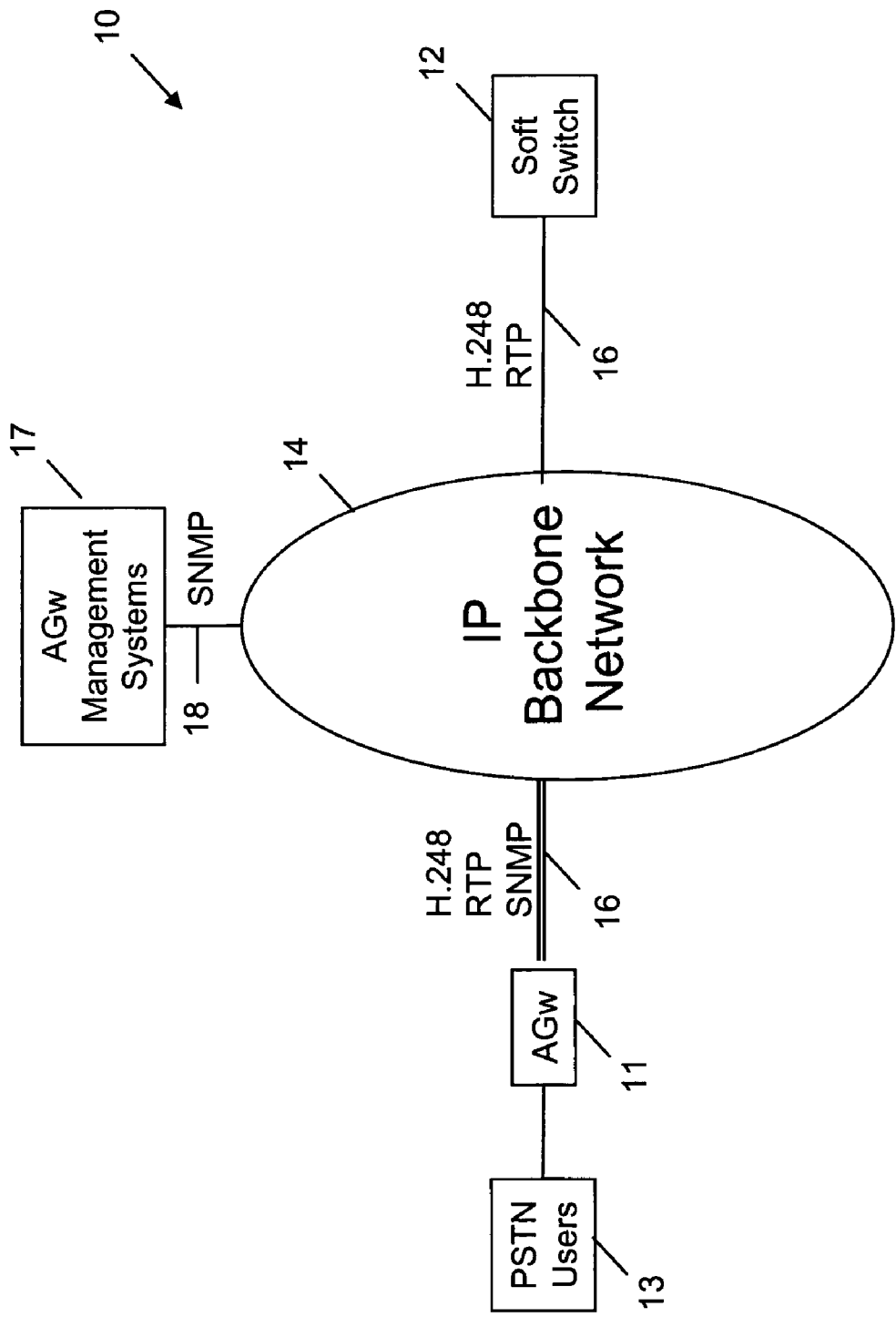
FIG. 1 (Prior Art) is a simplified block diagram illustrating an existing network architecture for controlling an Access Gateway from a Soft Switch.
Figure 2:
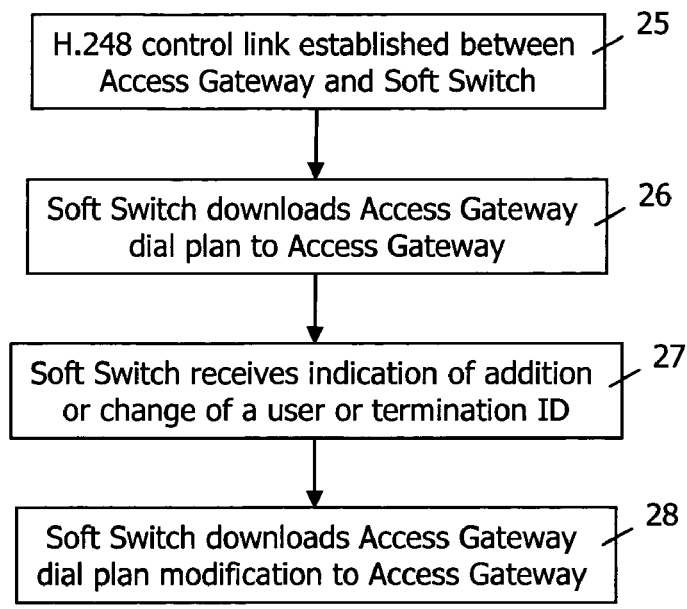
FIG. 2 is a flow chart illustrating the steps of an exemplary embodiment of the method of the present invention.

FIG. 2 is a flow chart illustrating the steps of an exemplary embodiment of the method of the present invention. As noted above, the Soft Switch 22 has knowledge of the relationship between the subscriber number and the Directory Number, the H.248 control link 16, and the termination ID to be used in the Access Gateway 21. At step 25, the H.248 control link is established between the Access Gateway 21 and the Soft Switch 22. At step 26, the Soft Switch downloads the Access Gateway dial plan to the Access Gateway. The dial plan includes termination IDs and Directory Numbers/Subscriber Numbers (DN/SNBs) for all of the users connected to the Access Gateway. At step 27, the Soft Switch receives an indication of an addition or change of a user or termination ID. At step 28, the Soft Switch downloads the modification of the Access Gateway dial plan to the Access Gateway. In this manner, the Access Gateway always has an up to date dial plan whenever the DN/SNB is changed in the Soft Switch.

When the subscriber number (DN/SNB) is downloaded, the procedure to setup the call is similar to an overload procedure, except that the called user belongs to the Access Gateway 21 and the call is setup internally in the Access Gateway when the H.248 control link is broken. If enough priority is given, the Soft Switch 22 may handle the connection.

Figure 3:
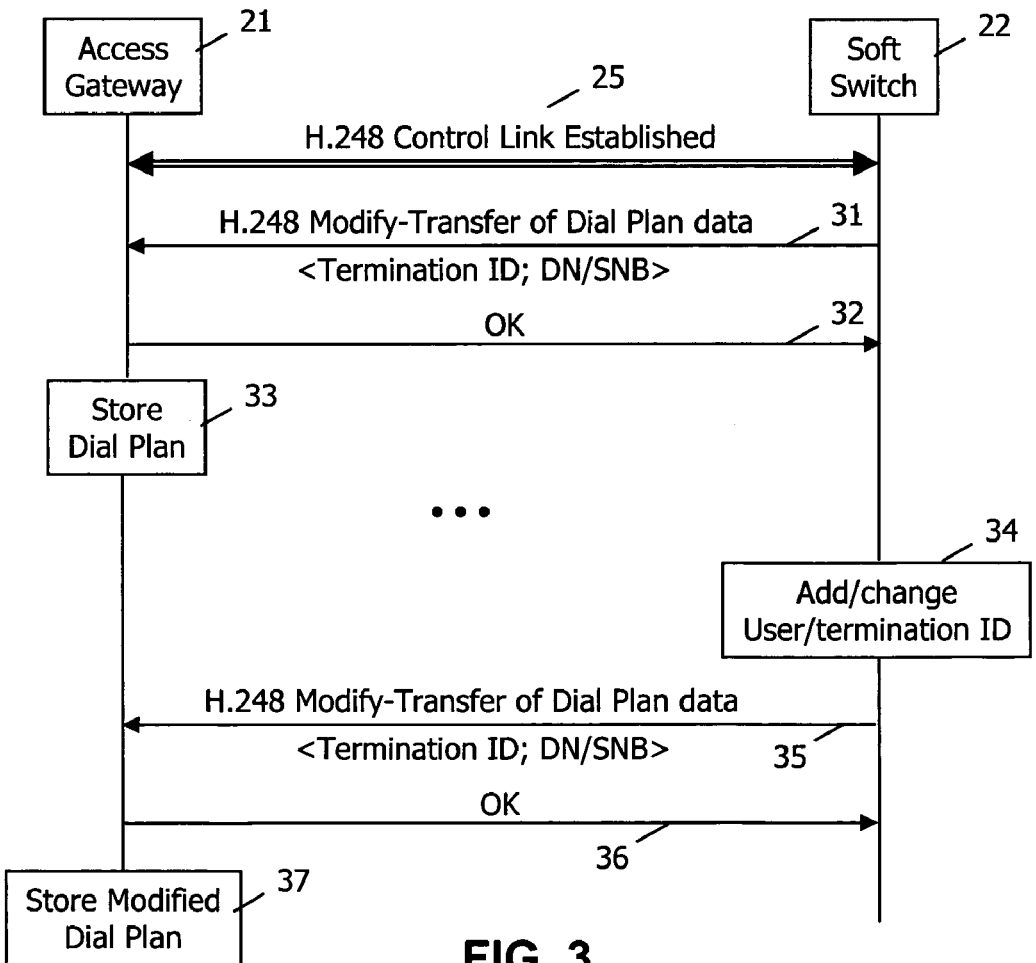
FIG. 3 is a signaling diagram illustrating the flow of signaling messages between the Access Gateway and the Soft Switch when performing the method of FIG. 2.

FIG. 3 is a signaling diagram illustrating the flow of signaling messages between the Access Gateway 21 and the Soft Switch 22 when performing the method of FIG. 2. At 25, the H.248 control link is established between the Access Gateway and the Soft Switch. The Soft Switch then sends a first H.248 Modify message 31 to the Access Gateway and includes the Access Gateway dial plan. The dial plan includes termination IDs and Directory Numbers/Subscriber Numbers (DN/SNBs) for all of the users connected to the Access Gateway. The Access Gateway responds with an OK message 32, and stores the dial plan at 33. Subsequently, the Soft Switch receives an indication 34 of an addition or change of a user or termination ID. The Soft Switch then sends a second H.248 Modify message 35 to the Access Gateway and includes the modification of the Access Gateway dial plan. Alternatively, the second Modify message 35 may include the entire modified Access Gateway dial plan, which then replaces the Access Gateway dial plan downloaded in the first Modify message 31. The Access Gateway responds with an OK message 36, and stores the modified dial plan at 37.

Figure 4:
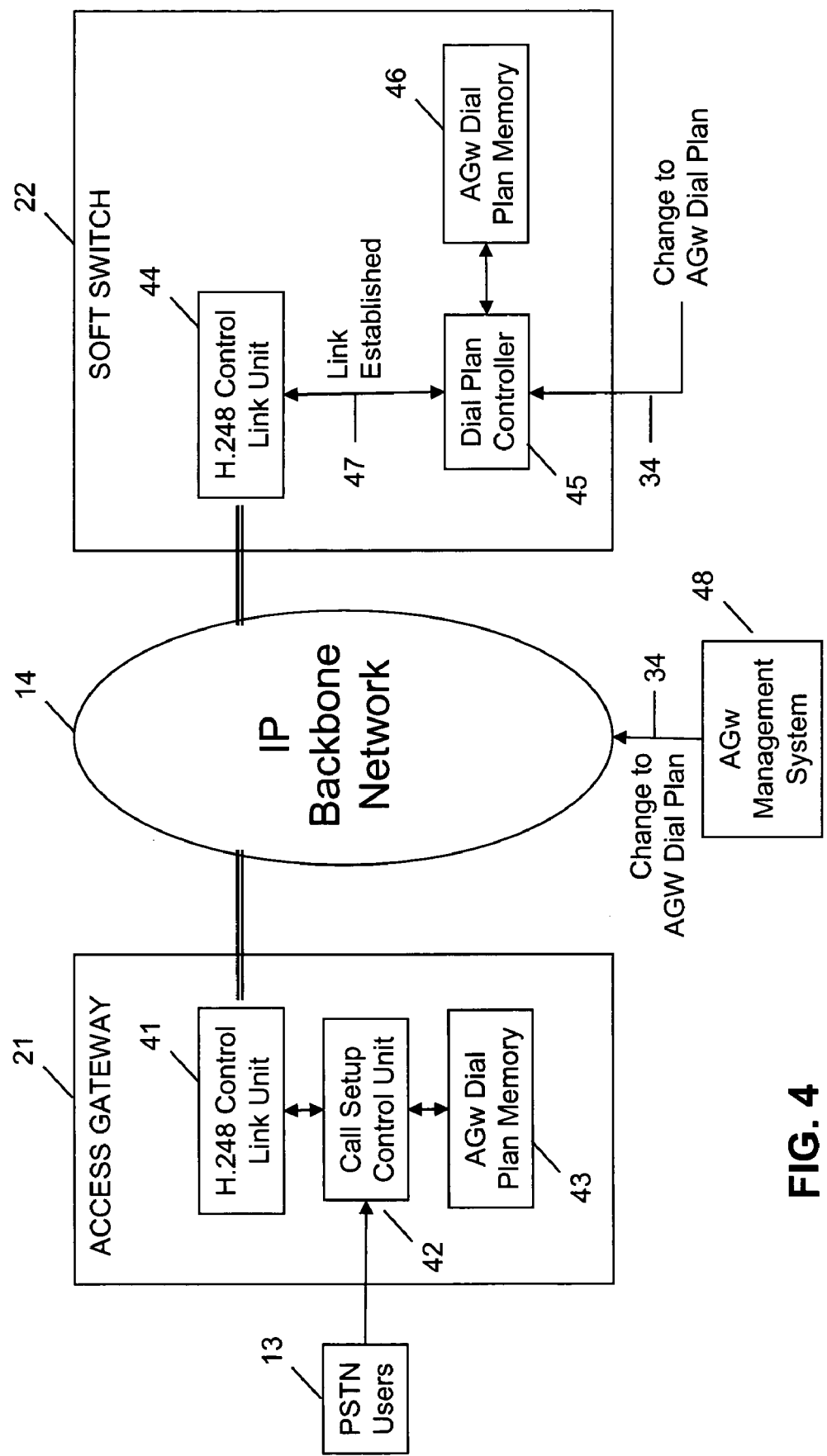
FIG. 4 is a simplified block diagram of a network architecture that includes an Access Gateway and a Soft Switch modified in accordance with the teachings of the present invention.

FIG. 4 is a simplified block diagram of a network architecture that includes an Access Gateway 21 and a Soft Switch 22 modified in accordance with the teachings of the present invention. The Access Gateway includes an H.248 Control Link Unit 41 for establishing the H.248 control link, a Call Setup Control Unit 42 for setting up calls with users in the PSTN 13, and an AGw Dial Plan Memory 43 for storing the Access Gateway dial plan. The Soft Switch includes an H.248 Control Link Unit 44 for establishing the H.248 control link, a Dial Plan Controller 45 for controlling the download of dial plan data to the Access Gateway, and an AGw Dial Plan Memory 46 for storing the Access Gateway dial plan.

The H.248 Control Link Units 41 and 44 establish the H.248 control link between the Access Gateway 21 and the Soft Switch 22. In the Soft Switch, the H.248 Control Link Unit 44 sends an indication 47 to the Dial Plan Controller 45 indicating that the link is established. In response, the Dial Plan Controller retrieves the Access Gateway dial plan from the AGw Dial Plan Memory 46 and downloads the dial plan to the Access Gateway utilizing the first H.248 Modify message 31 (FIG. 3). The Access Gateway stores the dial plan in the AGw Dial Plan Memory 43.

Subsequently, whenever the Soft Switch 22 receives an indication 34 of an addition or change of a user or termination ID, the Dial Plan Controller 45 stores the modification in the AGw Dial Plan Memory 46 and sends the modification to the Access Gateway 21 in the second H.248 Modify message 35 (FIG. 3). Alternatively, the second Modify message 35 may include the entire modified Access Gateway dial plan, which then replaces the Access Gateway dial plan downloaded in the first Modify message 31. In this manner, the invention ensures that the Access Gateway dial plan is always up to date in the Access Gateway if there is a failure of the H.248 control link.

In another embodiment of the present invention, an Access Gateway Management System 48 may update or modify the dial plan in the Access Gateway 21 by sending the indication 34 of an addition or change of a user or termination ID directly to the Access Gateway 21 through the IP backbone network 14.

Although preferred embodiments of the present invention have been illustrated in the accompanying drawings and described in the foregoing Detailed Description, it is understood that the invention is not limited to the embodiments disclosed therein, but is defined by the following claims.

The invention claimed is:

1. A method of responding to a control link failure between an Access Gateway and a Soft Switch, wherein the Soft Switch has access to a current user dial plan required for call setup, said method comprising the steps of:
   maintaining the current user dial plan in a memory in the Access Gateway, said maintaining step including the following steps performed prior to failure of the control link:
      in response to initial establishment of the control link, downloading the current dial plan from the Soft Switch to the Access Gateway; and
      storing the downloaded current dial plan in the Access Gateway memory; and
   in response to the control link failure between said Access Gateway and said Soft Switch, setting up the call internally in the Access Gateway utilizing the stored user dial plan from the Access Gateway memory;
   wherein the maintaining step also includes automatically updating the user dial plan in the Access Gateway whenever there is a change in the user dial plan, wherein the step of automatically updating the user dial plan includes the steps of:
      receiving by the Soft Switch, changed information in the user dial plan;
      in response to receiving the chanced information, automatically downloading the changed information to the Access Gateway; and
      modifying the stored user dial plan by the Access Gateway utilizing the changed information received from the Soft Switch.

2. The method as recited in claim 1, wherein the user dial plan includes termination identifications and associated Directory Numbers/Subscriber Numbers, DN/SNBs, for users connected to the Access Gateway.

3. A method of responding to a control link failure between an Access Gateway and a Soft Switch, wherein the Soft Switch has access to a current user dial plan required for call setup, said method comprising the steps of:
  maintaining the current user dial plan in a memory in the Access Gateway, said maintaining step including the following steps performed prior to failure of the control link:
    in response to initial establishment of the control link, downloading the current dial plan from the Soft Switch to the Access Gateway; and
    storing the downloaded current dial plan in the Access Gateway memory; and
  in response to the control link failure between said Access Gateway and said Soft Switch, setting up the call internally in the Access Gateway utilizing the stored user dial plan from the Access Gateway memory;
  wherein the maintaining step also includes automatically updating the user dial plan in the Access Gateway whenever there is a change in the user dial plan, wherein the step of automatically updating the user dial plan includes the steps of:
    receiving by the Soft Switch, changed information in the user dial plan; and
    in response to receiving the changed information, modifying the user dial plan with the changed information and automatically downloading a modified user dial plan to the Access Gateway.

4. A Soft Switch for maintaining a current user dial plan in an Access Gateway, said Soft Switch comprising:
  means for accessing the current user dial plan;
  means for establishing a control link between the Access Gateway and the Soft Switch;
  means for downloading the current dial plan from the Soft Switch to the Access Gateway in response to establishing the control link and allowing the Access Gateway to independently set up a call utilizing the downloaded dial plan in response to a control link failure between said Soft Switch and said Access Gateway; and
  means for automatically updating the user dial plan in the Access Gateway whenever there is a change in the user dial plan;
  wherein the means for automatically updating the user dial plan includes:
    means for receiving changed information in the user dial plan; and
    means for automatically downloading the changed information to the Gateway in response to receiving the changed information.

5. The Soft Switch as recited in claim 4, wherein the user dial plan includes termination identifications and associated Directory Numbers/Subscriber Numbers, DN/SNBs, for users connected to the Access Gateway.

6. A Soft Switch for maintaining a current user dial plan in an Access Gateway, said Soft Switch comprising:
  means for accessing the current user dial plan;
  means for establishing a control link between the Access Gateway and the Soft Switch;
  means for downloading the current dial plan from the Soft Switch to the Access Gateway in response to establishing the control link and allowing the Access Gateway to independently set up a call utilizing the downloaded dial plan in response to a control link failure between said Soft Switch and said Access Gateway; and
  means for automatically updating the user dial plan in the Access Gateway whenever there is a change in the user dial plan;
  wherein the means for automatically updating the user dial plan includes:
    means for receiving changed information in the user dial plan;
    means for modifying the user dial plan with the changed information; and
    means for automatically downloading a modified user dial plan to the Access Gateway in response to receiving the changed information.

7. A system for responding to a control link failure between an Access Gateway and a Soft Switch, wherein the Soft Switch has access to a current user dial plan for call setup, said system comprising:
  means in the Soft Switch for automatically sending the current user dial plan to the Access Gateway when the control link to the Access Gateway is initially established and prior to failure of the control link:
  a memory in the Access Gateway for storing the current user dial plan;
  means in the Access Gateway for determining that the control link with the Soft Switch has failed;
  means in the Access Gateway, responsive to the control link failure, for setting up the call internally in the Access Gateway utilizing the stored user dial plan from the Access Gateway memory; and
  an Access Gateway Management System for sending updates for the user dial plan to the Access Gateway after the soft switch has downloaded the current user dial plan to the Access Gateway.

8. The system as recited in claim 7, wherein the Access Gateway and the Soft Switch include means for establishing a control link between the Access Gateway and the Soft Switch through an IP backbone network, and the Soft Switch includes means for downloading the current dial plan from the Soft Switch to the Access Gateway in response to establishing the control link.

9. The system as recited in claim 8, further comprising means for automatically updating the user dial plan in the Access Gateway, said means for automatically updating including:
  means in the Soft Switch for receiving changed information in the user dial plan;
  means in the Soft Switch for automatically downloading the changed information to the Access Gateway; and
  means in the Access Gateway for modifying the stored user dial plan utilizing the changed information received from the Soft Switch.

10. The system as recited in claim 8, wherein the Soft Switch includes means for automatically updating the user dial plan in the Access Gateway, said means for automatically updating including:
  means for receiving changed information in the user dial plan;
  means for modifying the user dial plan with the changed information; and
  means for automatically downloading a modified user dial plan to the Access Gateway in response to receiving the changed information.

11. The system as recited in claim 7, wherein the user dial plan includes termination identifications and associated Directory Numbers/Subscriber Numbers, DN/SNBs for users connected to the Access Gateway.

12. An Access Gateway for setting up a call when a control link between the Access Gateway and a Soft Switch has failed, wherein the Soft Switch has access to a current user dial plan, said Access Gateway comprising:

means for receiving the current user dial plan from the Soft Switch upon initial establishment of the control link;

a memory for storing the current user dial plan in the Access Gateway;

means for determining by the Access Gateway that the control link with the Soft Switch has failed;

means, responsive to the control link failure, for setting up the call internally in the Access Gateway utilizing the stored user dial plan from the memory;

means for automatically receiving downloaded changed information; and means for modifying the stored user dial plan utilizing changed information received from the Soft Switch.

* * * * *

UNITED STATES PATENT AND TRADEMARK OFFICE
CERTIFICATE OF CORRECTION

| | | |
|---|---|---|
| PATENT NO. | : 8,331,219 B2 | Page 1 of 1 |
| APPLICATION NO. | : 12/531417 | |
| DATED | : December 11, 2012 | |
| INVENTOR(S) | : Haster | |

It is certified that error appears in the above-identified patent and that said Letters Patent is hereby corrected as shown below:

In the Claims:

In Column 4, Line 60, in Claim 1, delete "chanced" and insert -- changed --, therefor.

In Column 5, Line 51, in Claim 4, delete "Gateway" and insert -- Access Gateway --, therefor.

Signed and Sealed this
Second Day of April, 2013

Teresa Stanek Rea
*Acting Director of the United States Patent and Trademark Office*